(12) United States Patent
Atcheson

(10) Patent No.: US 7,213,734 B2
(45) Date of Patent: May 8, 2007

(54) PNEUMATIC TOOL DRIVE SYSTEM

(76) Inventor: John C. Atcheson, 4545 Powers Rd., Marietta, GA (US) 30067

( * ) Notice: Subject to any disclaimer, the term of this patent is extended or adjusted under 35 U.S.C. 154(b) by 0 days.

(21) Appl. No.: 11/235,949

(22) Filed: Sep. 27, 2005

(65) Prior Publication Data

US 2007/0068988 A1    Mar. 29, 2007

(51) Int. Cl.
B25C 1/14    (2006.01)
(52) U.S. Cl. ................................. 227/130; 227/156
(58) Field of Classification Search ............... 227/130, 227/156, 112
See application file for complete search history.

(56) References Cited

U.S. PATENT DOCUMENTS

| | | | |
|---|---|---|---|
| 3,601,007 A * | 8/1971 | Korth | 91/165 |
| 3,672,029 A * | 6/1972 | Butriss | 29/243.56 |
| 3,802,519 A | 4/1974 | Newton | 173/169 |
| 3,945,571 A | 3/1976 | Rash | 239/152 |
| 4,662,551 A | 5/1987 | Dudley et al. | 224/211 |
| 5,407,096 A | 4/1995 | Smith | 222/1 |
| 5,562,240 A * | 10/1996 | Campbell | 227/130 |
| 5,957,119 A * | 9/1999 | Perry et al. | 124/73 |
| 6,539,969 B1 | 4/2003 | Sullivan | 137/15.18 |
| 6,637,450 B2 | 10/2003 | Huang | 137/68.3 |
| 6,672,332 B2 | 1/2004 | Carroll | 137/505.25 |
| 6,675,791 B1 | 1/2004 | Alexander et al. | 124/71 |
| 6,675,824 B2 | 1/2004 | Collado et al. | 137/116.5 |
| 6,786,379 B2 * | 9/2004 | Largo | 227/10 |
| 2001/0002701 A1 | 6/2001 | Sullivan, Sr. et al. | 251/321 |
| 2003/0075219 A1 | 4/2003 | Carroll | 137/505.25 |
| 2003/0127238 A1 | 7/2003 | Largo | 173/200 |
| 2003/0173098 A1 | 9/2003 | Miner et al. | 173/200 |
| 2004/0000343 A1 | 1/2004 | Turan, Jr. | 137/561 |
| 2004/0183043 A1 | 9/2004 | Slimes et al. | 251/144 |
| 2004/0187929 A1 | 9/2004 | Carroll | 137/505.25 |
| 2004/0200531 A1 | 10/2004 | Zuck | 137/505.25 |
| 2005/0045230 A1 | 3/2005 | Carroll | 137/505.28 |
| 2005/0103383 A1 | 5/2005 | Carroll | 137/505.28 |
| 2005/0111995 A1 | 5/2005 | Everson | 417/313 |

* cited by examiner

Primary Examiner—Brian Nash
(74) Attorney, Agent, or Firm—Needle & Rosenberg, P.C.

(57) ABSTRACT

The invention relates to a pneumatic tool drive system, comprising a portable pressure source, a valve assembly, a regulating assembly, and a pneumatic assembly. The pneumatic assembly can be any conventional pneumatic device. The pneumatic assembly may be a pneumatic tool, such as, but not limited to, a nail gun, a power sprayer, a torque wrench, and the like. The pneumatic tool drive system gives the operator the freedom to move about his work space free of cumbersome hoses and compressors.

31 Claims, 6 Drawing Sheets

PNEUMATIC TOOL DRIVE SYSTEM

FIELD OF THE INVENTION

The present invention relates generally to a portable power system and method for driving tools or other implements; and more particularly to a pressurized fluid drive system and method for power tools and the like, utilizing fluid dispensed from a self-contained portable canister.

BACKGROUND OF THE INVENTION

Pneumatic tools and other implements are commonly used in various industrial, residential, automotive and other applications. For example, pneumatic nail-guns and staplers are commonly used in the construction trades, power impact wrenches and lifts are used in automotive repair and maintenance, and power paint sprayers and rollers are used in various paint and finish applications. Various other tasks are or can be performed with the assistance of pneumatic tools and implements.

Known pneumatic tools and implements commonly utilize a pressurized fluid such as air or $CO_2$. In other known systems and methods, a controlled explosion of butane or other hydrocarbon fuel source is utilized as a power source for nail-guns and the like.

Such previously known systems and methods for driving pneumatic tools and implements have been found to have a number of disadvantages. For example, pneumatic drive systems generally require that the tool be connected, typically by a length of hose, to a stationary compressor or the like. This limits the applicability of such systems to applications requiring ease of portability, and presents safety risks and inconveniences resulting from the hoses being stretched through the workplace, often becoming entangled with other equipment and creating tripping hazards. Butane cartridges, compressors, and other equipment associated with previously known systems and methods also tend to be quite expensive, and/or to require frequent maintenance, adding further expense and inconvenience.

Thus it can be seen that needs exist for improved systems and methods for driving power tools and other implements. It is to the provision of improved systems and methods meeting these and other needs that the present invention is primarily directed.

SUMMARY

The present invention pertains to a pneumatic tool drive system, comprising a portable pressure source, a valve assembly, a regulating assembly, and a pneumatic assembly. The pneumatic assembly can be any conventional pneumatic device. The pneumatic assembly may be a pneumatic tool, such as, but not limited to, a nail gun, a power sprayer, a torque wrench, and the like. The pneumatic tool drive system gives the operator the freedom to move about his work space free of cumbersome hoses and compressors.

The portable pressure source can comprise a variety of embodiments. In one aspect, the portable pressure source is a vessel containing a pressurized fluid. The pressurized fluid may comprise carbon dioxide, air, or any other conventional pressurized drive fluid. In some cases, the vessel is a paintball container or other commonly used pressure source. Paint ball containers work well because they are readily available and have common characteristics.

The valve assembly comprises a collar having an outer surface and is in communication with the pressurized fluid source. The regulating assembly is adapted for releasable engagement with the outer surface of the collar of the valve assembly. The pneumatic assembly is adapted for releasable engagement with an outlet port of the regulating assembly.

In one aspect, the regulating assembly comprises a body, an inlet port disposed therein the first end of the body, a substantially cylindrical axial bore disposed therein the body, an outlet port disposed therethrough the side wall of the body, a cap for engaging an exterior surface of the body, a bias element disposed therein the interior cavity, supported by the second end of the body, and a plunger.

DETAILED DESCRIPTION OF THE DRAWINGS

These and other features of the preferred embodiments of the present invention will become more apparent in the detailed description, in which reference is made to the appended drawings wherein.

DETAILED DESCRIPTION OF THE INVENTION

Before the present articles, devices, assemblies and/or methods are disclosed and described, it is to be understood that this invention is not limited to the specific articles, devices, assemblies and/or methods disclosed unless otherwise specified, as such may, of course, vary. It is also to be understood that the terminology used herein is for the purpose of describing particular embodiments only and is not intended to be limiting.

As used herein, the singular forms "a," "an" and "the" include plural referents unless the context clearly dictates otherwise. The embodiments are described with reference to the figures, in which like numbers indicate like parts throughout the figures.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Figure 1:
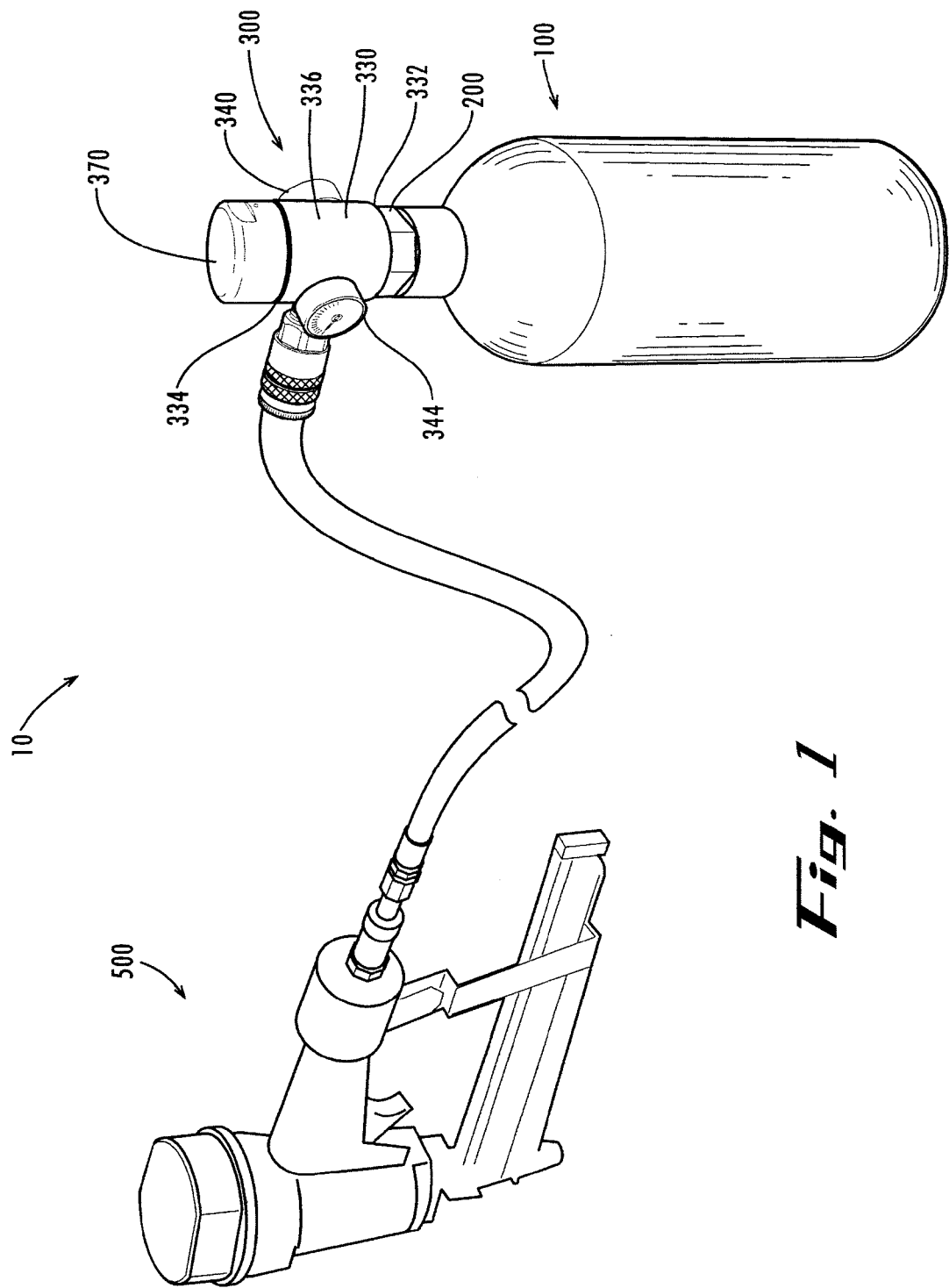
FIG. 1 is a perspective view of the pneumatic tool drive system showing the regulating assembly attached to a pneumatic nail gun.
Figure 2:
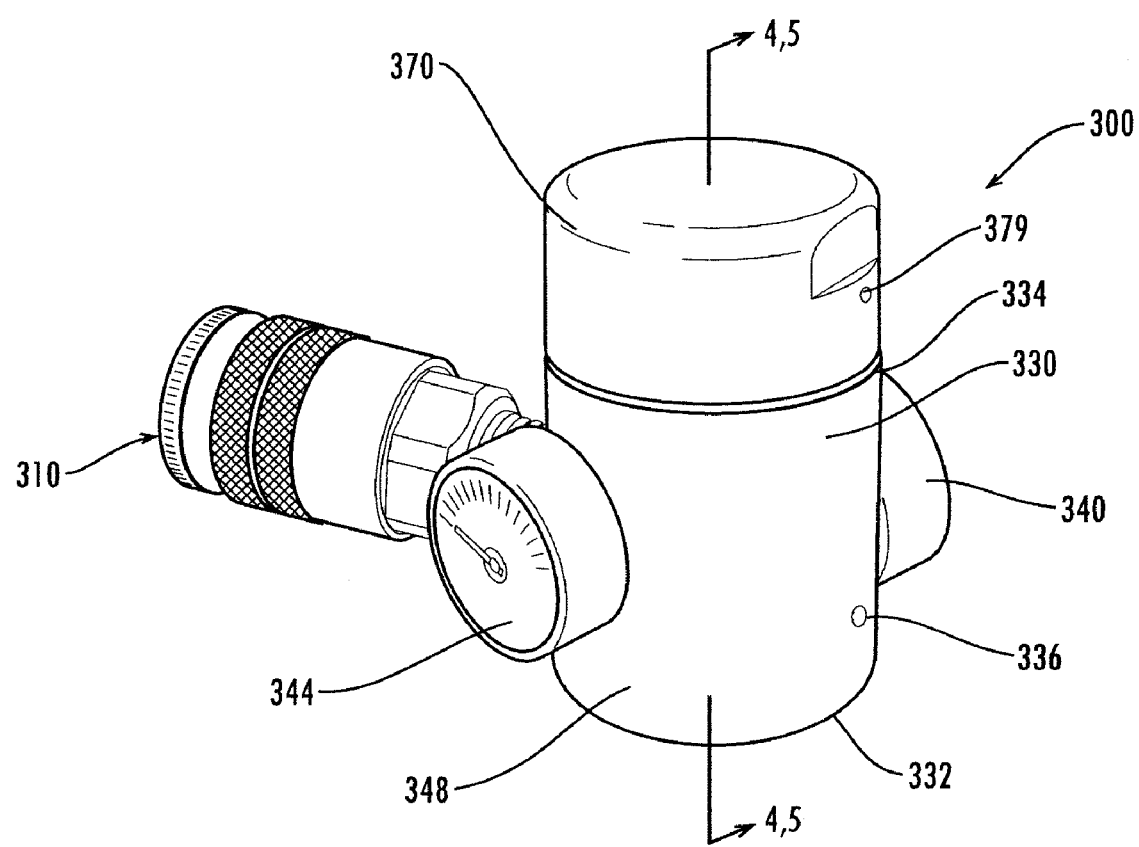
FIG. 2 is a perspective view of the regulating assembly of the pneumatic tool drive system of FIG. 1.

The invention is a pneumatic tool drive system 10, comprising a portable pressure source 100, a valve assembly 200, a regulating assembly 300, and a pneumatic assembly 500. The pneumatic assembly 500 can be any conventional pneumatic device. The pneumatic assembly may be a pneumatic tool, such as, but not limited to, a nail gun, a power sprayer, a torque wrench, and the like. The pneumatic tool drive system gives the operator the freedom to move about his work space free of cumbersome hoses and compressors. In most aspects, as can be seen in FIG. 1, the tool drive system 10 is easily transportable.

The portable pressure source 100 can comprise a variety of embodiments. In one aspect, the portable pressure source is a vessel containing a pressurized fluid. The pressurized fluid may comprise carbon dioxide, air, or any other conventional pressurized drive fluid. In some cases, the vessel is a paintball container or other commonly used pressure source. Paint ball containers work well because they are readily available and have common characteristics.

The vessel containing the pressurized fluid should be small enough to be relatively portable. In one aspect, and not meant to be limiting, it has a capacity of from about 5 ounces to about 50 ounces. In another aspect the capacity is from about 15 ounces to about 45 ounces. In yet another aspect, the vessel has a capacity of about 20 ounces. Pressurized air is measured in cubic inches. As such, in one aspect, the capacity of the vessel is from about 10 in$^3$ to about 200 in$^3$. As one in the art can appreciate, the capacity of the vessel has a direct correlation to the amount of weight that the user is going to have to transport.

The fluid is generally initially pressurized from about 20 psi to about 6,000 psi. As one skilled in the art can appreciate, as the pneumatic assembly is used, the pressure in the pressure source 100 will decrease. In yet another aspect, initial pressure in the pressure source is about 840 psi.

The valve assembly 200 is for use with the pressure source 100. In one aspect, the valve assembly can be selectively positioned in an open position in which at least a portion of the pressurized fluid is enabled to flow therethrough the valve assembly, or a closed position in which the pressurized fluid is prevented from flowing therethrough the valve assembly. In one aspect, and not meant to be limiting, the valve assembly 200 comprises a needle valve. As one in the art will appreciate, the valve assembly may be almost any conventional valve assembly. For example, the valve assembly used in most conventional paint ball canisters is a PMI valve assembly. The PMI valve assembly is described in full in U.S. Pat. No. 6,539,969 to Sullivan, which is incorporated herein in its entirety by reference. The benefit of marrying the regulating assembly 300 to a conventional valve assembly, such as the PMI valve assembly, is that such a valve assembly is readily commercially available.

In some instances, the regulating assembly will be releasably mounted to the outer surface 212 of the collar 210 of the valve assembly 200. In this aspect, when the regulating assembly is mounted thereon the outer surface 212 of the collar 210 of the valve assembly, the valve assembly will be in the open position. Conversely, when the regulating assembly 300 is dismounted from the outer surface of the collar of the valve assembly, the valve assembly will be in the closed position.

The regulating assembly 300 regulates the pressure needed to supply the pneumatic assembly 500. In one aspect, as illustrated in FIGS. 1–6 and further discussed herein below, the regulating assembly comprises a body 330 with an inlet port 320, an outlet port 310, a substantially cylindrical axial bore 360, a bias element 380, a plunger 400, and a cap 370.

The inlet port 320 is disposed in the first end 332 of the body 330 and adapted to engage the outer surface of the collar of the valve assembly 200. In one aspect, there may be a nipple 324 disposed therein a portion of the inlet port. In this aspect, when the regulating assembly is mounted thereon the valve assembly, the nipple 324 engages the valve assembly to position the valve assembly 200 in the open position.

The regulating assembly 300 of this aspect further comprises a substantially cylindrical axial bore 360 disposed therein the body. The axial bore 360 terminates at the distal end 322 of the inlet port 320. This aspect is further characterized by an outlet port 310 disposed therethrough the side wall 336 of the body. The outlet port 310 is in fluid communication with the axial bore.

In this aspect, the regulating assembly also has a cap 370 for engaging the exterior surface 348 of the body at the second end 334 of the body. The second end 334 of the body and the cap 370 define an interior cavity 372. Disposed within the interior cavity 372 is a bias element 380, which is supported by the second end of the body. In one aspect, the bias element is a spring.

Additionally, in this aspect, the regulating assembly also has a plunger 400. The plunger 400 comprises a bonnet 410 and a stem 420. At least a portion of the stem 420 is disposed therein a portion of the axial bore 360, while the bonnet 410 is disposed within the interior cavity. As such, the plunger is biased against the bias element 380 for movement between a sealed position, arresting the flow of fluid between the inlet port and the outlet port, and an open position, allowing fluid flow between the inlet port 320 and the outlet port 310.

Figure 5:
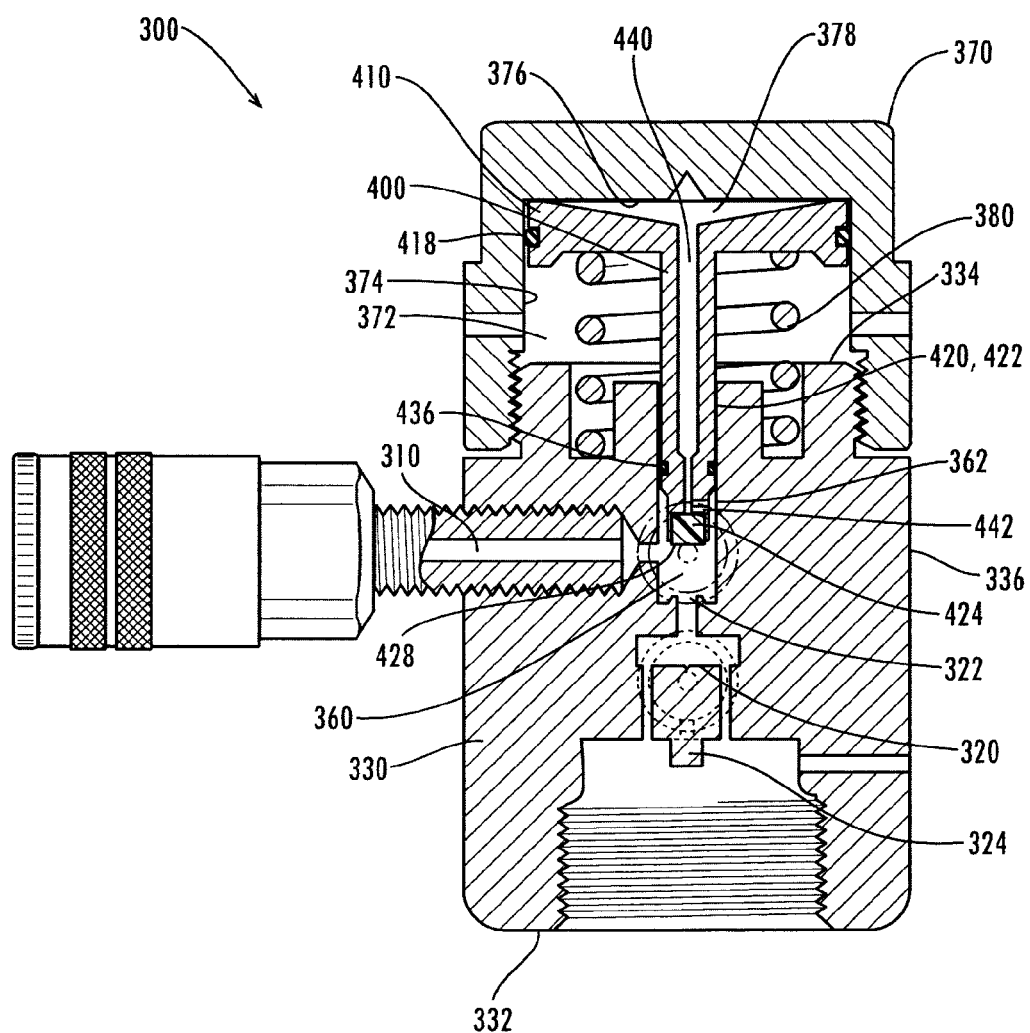
FIG. 5 is a side cross-sectional view of the regulating assembly of FIG. 2, cut along line 4,5–4,5, showing the plunger in the open position.

As illustrated in FIG. 5, in one aspect, the elongate stem comprises a stem section 422 and a port section 424. The stem section 422 is cylindrical and the port section 424 extends therefrom a distal end 428 of the plunger. In this aspect, the distal end 428 of the stem 420 of the plunger defines a sealant cavity 430 for frictional retention of a sealant 432. The sealant 432 can be, for example and without limitation, virgin TEFLON™. However, any sealant known in the art is contemplated.

In one particular aspect, as illustrated in FIG. 5, the plunger 400 further comprises a longitudinal fluid conduit 440 extending substantially therethrough the plunger. The fluid conduit 440 comprises an axial port therein the port section of the stem 420 that extends therethrough a sidewall 426 of the port section. As shown, the diameter d of the port section 424 is less than the diameter D of the stem section. This enables fluid to flow around the port section of the stem of the plunger and into the axial port. In one aspect, the axial port has a diameter smaller than the diameter of the longitudinal fluid conduit 440.

Figure 3:
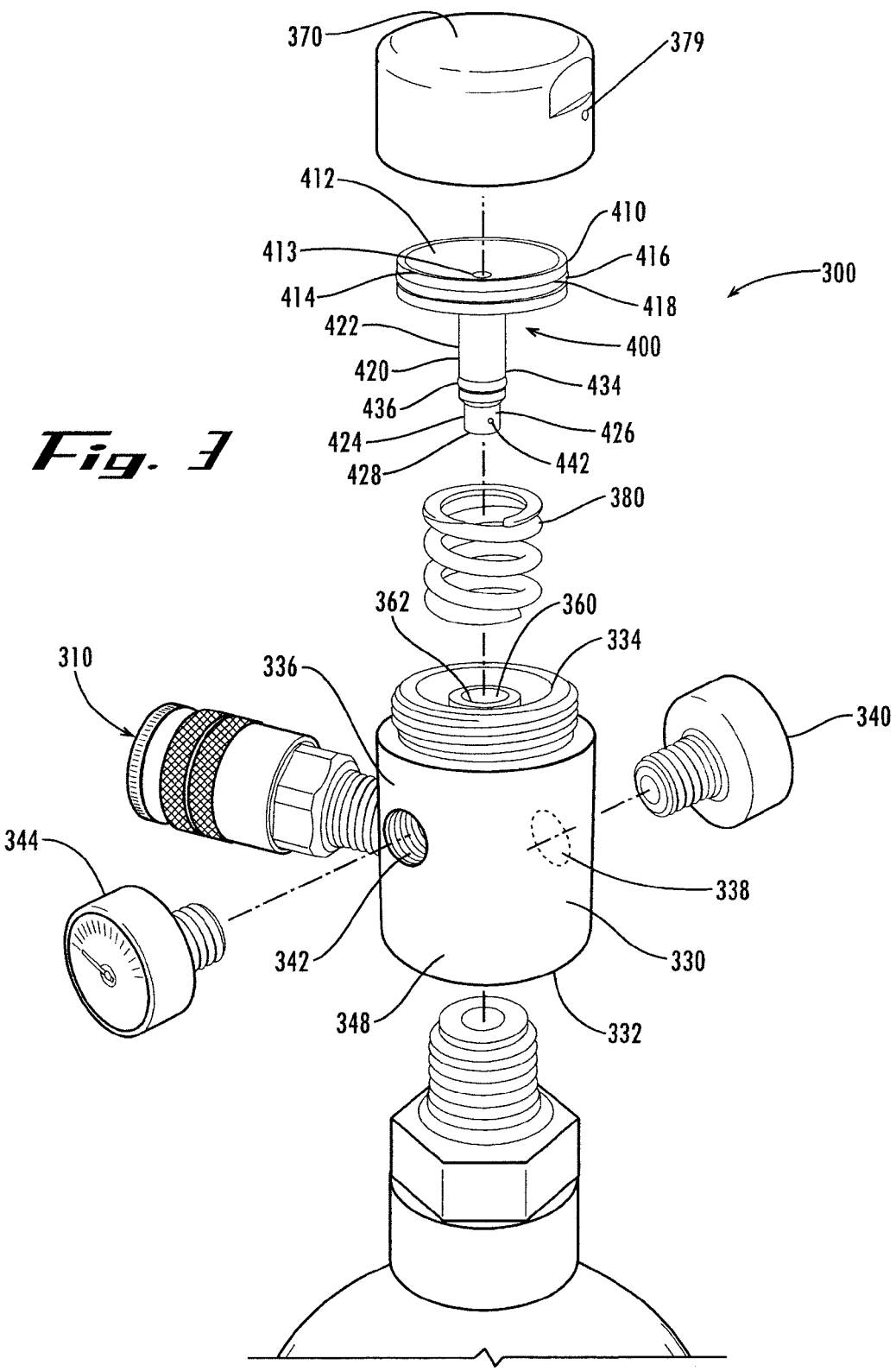
FIG. 3 is a partially exploded perspective view of the regulating assembly of FIG. 2, showing a bias element, a cap, a plunger, a working pressure indicator, an inlet pressure indicator, and an outlet port.
Figure 4:
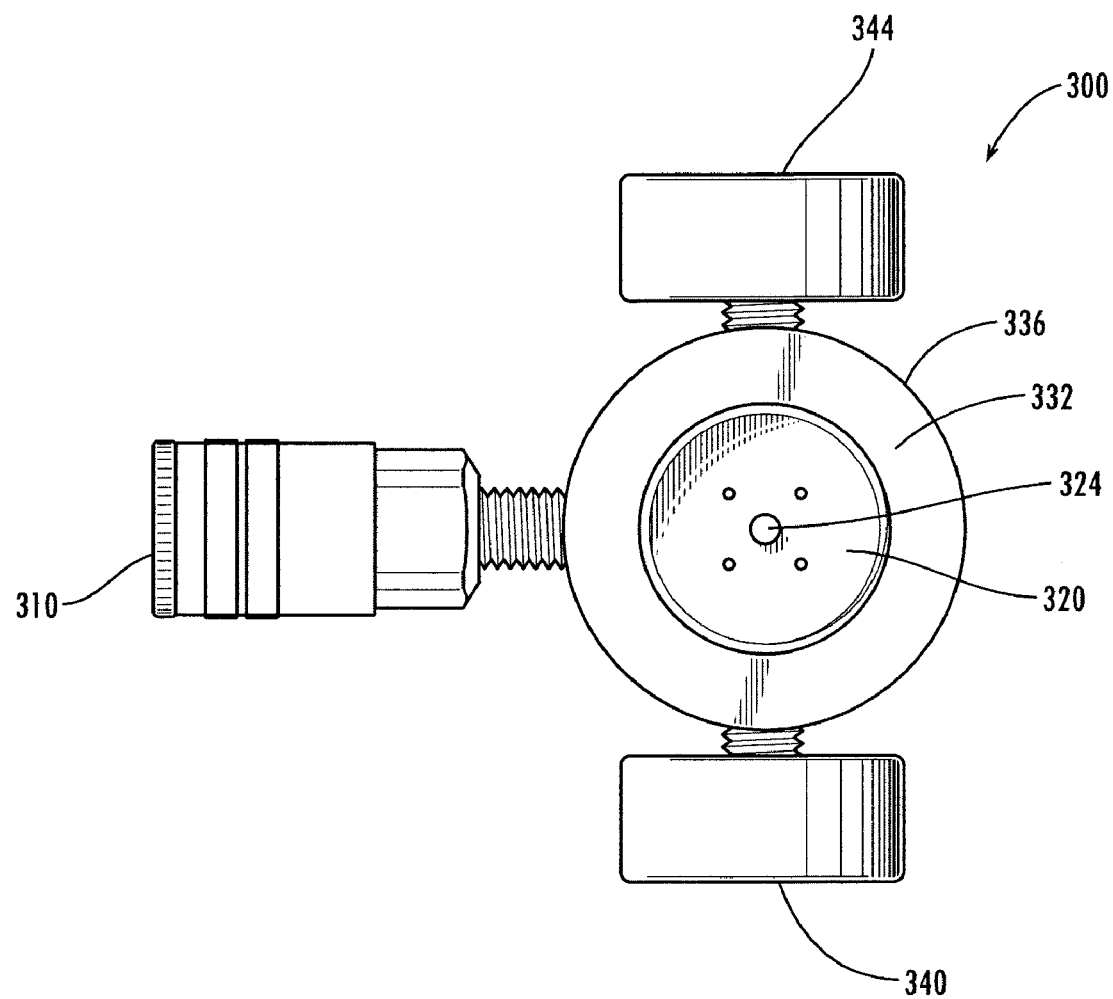
FIG. 4 is a bottom plan view of the regulating assembly of FIG. 2 showing an inlet port.
Figure 6:
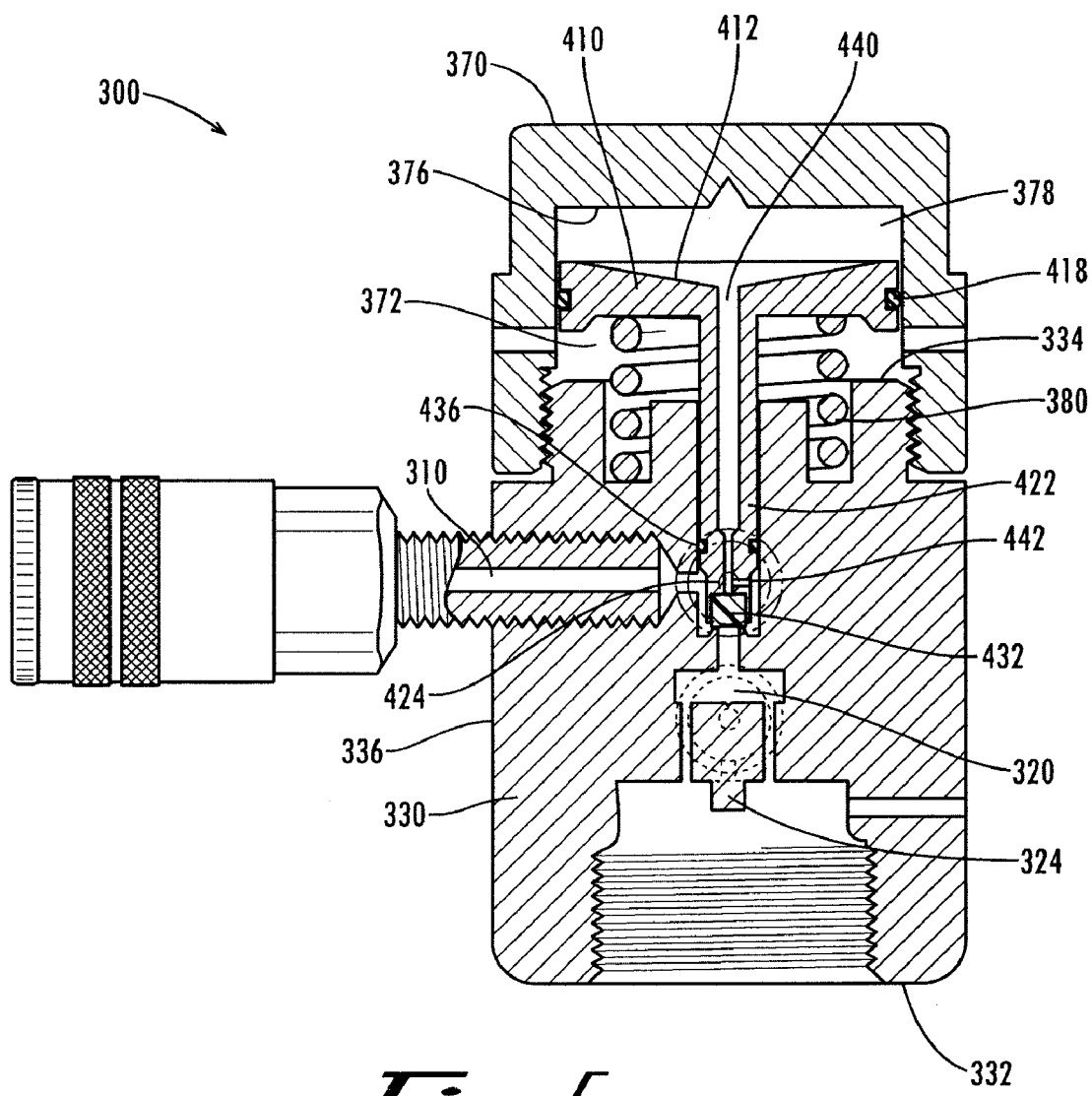
FIG. 6 is a side cross-sectional view of the regulating assembly of FIG. 2, cut along line 4,5–4,5, showing the plunger in the sealed position.

In one aspect, as illustrated in FIGS. 3, 5, and 6, the top face 412 of the bonnet and a portion of an interior surface 376 of the cap define a variable cavity. As one skilled in the art can appreciate, the pressure in the axial bore is substantially similar to the pressure in the variable cavity 378. However, since the bonnet of the plunger provides more surface area than the distal end 322 of the inlet port 320, when the pressure in the variable cavity 378 is sufficient, it will force the plunger 400, against the force of the bias element 380, to seal the distal end of the inlet port, arresting flow from the inlet port into the axial bore 360. The bias element is sized to move the plunger into the open position when the closing pressure (pressure in the variable cavity 378) is equal to or less than a pre-selected maximum allowable pressure, and when the closing pressure is greater than the pre-selected maximum allowable pressure, the force of the closing pressure upon the top face 412 of the bonnet 410 forces the plunger to move axially into the sealed position. The pre-selected maximum allowable pressure can be changed by changing the bias element. For example and not meant to be limiting, if the bias element is a spring, a spring with a different spring constant may be chosen. Additionally, adding elements, such as washers, onto the second end 334 of the body, substantially underlying the spring, would effectively compress the spring further and increase the amount of force necessary to overcome it.

In one aspect, the bonnet has a top face that is tapered downwardly from proximate its circumferential edge 141 to a center portion 413 of the top face 412. This taper design provides the variable cavity defined between the top face of the bonnet and a portion of the interior surface 376 of the cap. The same result could be achieved using a bonnet with a flat top face and a cap 370 that has a domed interior surface. In addition to providing volume for the variable cavity, tapering the top face 412 of the bonnet 410 also increases its surface area.

As shown in FIGS. 3, 5, and 6, in one aspect, there is a circumferential stem channel 434 extending into a sidewall 423 of the stem section 422 of the plunger 400. The stem channel 434 is fitted with a resilient stem o-ring substantially seated within the circumferential stem channel and at least partially extending outwardly therefrom the adjoining portions of the stem section. In use, the resilient stem o-ring forms a fluid-tight fit between the stem section 422 of the stem of the plunger and a wall 362 of the cylindrical axial bore 360 disposed therein the body 330.

Similarly, in this aspect, there is a circumferential bonnet channel 416 extending into a sidewall of the bonnet section of the plunger. The bonnet channel 416 is fitted with a resilient bonnet o-ring 418 substantially seated within the circumferential bonnet channel and at least partially extending outwardly therefrom the sidewall of the bonnet section. In use, the resilient bonnet o-ring 418 forms a fluid-tight fit between the bonnet 410 of the plunger 400 and a wall 374 of the interior cavity 372 defined by the second end of the body and the cap 370.

In one aspect of the pneumatic tool drive system, there may be an inlet pressure port 338 extending therethrough the side wall 336 of the body. The inlet pressure port 338 is in fluid communication with the inlet port 320 and comprises an inlet pressure indicator 340. This is illustrated in FIGS. 1–4. Additionally, the system may also comprise a working pressure port 342 disposed therethrough the side wall 336 of the body. The working pressure port 342 is in fluid communication with the axial bore which is disposed therein the body. The working pressure port further comprises a working pressure indicator 344.

In yet another aspect of the invention, the pneumatic assembly is releasably connected to the outlet port 310 of the regulating assembly. The outlet port may be equipped with a valve to selectively position the outlet port in an open position, in which at least a portion of the pressurized fluid is enabled to flow through the outlet port and into the pneumatic assembly, or a closed position in which the pressurized fluid is prevented from flowing through the outlet port 310 and into the pneumatic assembly 500. One example includes a conventional quick release pneumatic hose valve. However, as one skilled in the art will appreciate any conventional device for performing the same function would be appropriate.

The cap 370 of the regulating assembly may also have at least one pressure relief port positioned therethrough its sidewall and thereunder the bonnet of the plunger. This relief port is designed to release fluid captured between the stem o-ring and the bonnet o-ring 418.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims.

Moreover, although specific terms are employed herein, as well as in the claims which follow, they are used only in a generic and descriptive sense, and not for the purposes of limiting the described invention, nor the claims which follow.

I claim:

1. A pneumatic tool drive system, comprising:
   a portable pressure source;
   a valve assembly comprising a collar having an outer surface, the valve assembly in communication with the pressurized fluid source;
   a regulating assembly adapted for releasable engagement with the outer surface of the collar of the valve assembly, wherein the regulating assembly comprises:
   a body having a first end, a second end, and at least one sidewall;
      an inlet port disposed therein the first end of the body, configured to engage the outer surface of the collar of the valve assembly, the inlet port having a distal end;
      a substantially cylindrical axial bore disposed therein the body, the bore substantially terminating at the distal end of the inlet port;
      an outlet port disposed therethrough the side wall of the body wherein the outlet port is in fluid communication with the axial bore;
      a cap for engaging an exterior surface of the body at the second end of the body, wherein the second end of the body and the cap define an interior cavity;
      a bias element disposed therein the interior cavity, supported by the second end of the body; and
      a plunger having a bonnet and a stem, wherein at least a portion of the stem of the plunger is disposed therein a portion of the axial bore and the bonnet is disposed therein the interior cavity, wherein the plunger is biased against the bias element for movement between a sealed position, arresting the flow of fluid between the inlet port and the outlet port, and an open position, allowing fluid flow between the inlet port and the axial bore, wherein the elongate stem comprises a stem section and a port section, wherein the stem section is cylindrical, wherein the distal end of the stem of the plunger defines a sealant cavity for frictional retention of a sealant, wherein the port section extends therefrom a distal end of the plunger, wherein the diameter of the port section is less than the diameter of the stem section, wherein the plunger further comprises a longitudinal fluid conduit extending substantially therethrough the plunger, and wherein the fluid conduit comprises an axial port therein the port section of the stem that extends therethrough a sidewall of the port section; and
   a pneumatic assembly adapted for releasable engagement with an outlet port of the regulating assembly.

2. The pneumatic tool drive system of claim 1, wherein the portable pressure source is a vessel containing a pressurized fluid.

3. The pneumatic tool drive system of claim 2, wherein the pressurized fluid comprises carbon dioxide.

4. The pneumatic tool drive system of claim 2, wherein the pressurized fluid comprises air.

5. The pneumatic tool drive system of claim 2, wherein the vessel has a capacity of from about 5 ounces to about 50 ounces.

6. The pneumatic tool drive system of claim 2, wherein the vessel has a capacity of from about 10 $in^3$ to about 200 $in^3$.

7. The pneumatic tool drive system of claim 2, wherein the fluid is pressurized from about 20 psi to about 6,000 psi.

8. The pneumatic tool drive system of claim 2, wherein the vessel is a paintball container.

9. The pneumatic tool drive system of claim 1, wherein the valve assembly can be selectively positioned in an open position in which at least a portion of position in which the pressurized fluid is prevented from flowing therethrough the valve assembly.

10. The pneumatic tool drive system of claim 9, wherein the regulating assembly is releasably mounted to the outer surface of the collar of the valve assembly and wherein the valve assembly is in the open position when the regulating assembly is mounted thereon the outer surface of the collar of the valve assembly and the valve assembly is in the closed position when the regulating assembly is dismounted from the outer surface of the collar of the valve assembly.

11. The pneumatic tool drive system of claim 1, wherein the valve assembly comprises a needle valve.

12. The pneumatic tool drive system of claim 1, wherein the valve assembly is a PMI valve assembly.

13. The pneumatic tool drive system of claim 1, wherein the pneumatic assembly is a pneumatic tool.

14. The pneumatic tool drive system of claim 13, wherein the pneumatic tool is a nail gun.

15. The pneumatic tool drive system of claim 1, wherein the regulating assembly comprises means for regulating the pressure of the fluid exiting an outlet port of the regulating assembly.

16. The pneumatic tool drive system of claim 1, wherein the bias element is a spring.

17. The pneumatic tool drive system of claim 1, wherein the bonnet has a top face that is tapered downwardly from proximate its circumferential edge to a center portion of the top face.

18. The pneumatic tool drive system of claim 1, wherein the sealant is virgin polytetrafluoroethylene.

19. The pneumatic tool drive system of claim 1, further comprising a circumferential stem channel extending into a sidewall of the stem section of the plunger.

20. The pneumatic tool drive system of claim 19, further comprising a resilient stem o-ring substantially seated within the circumferential stem channel of the stem section and at least partially extending outwardly therefrom the adjoining portions of the stem section, whereby, in use, the resilient stem o-ring forms a fluid-tight fit between the stem section of the stem of the plunger and a wall of the cylindrical axial bore disposed therein the body.

21. The pneumatic tool drive system of claim 20, further comprising a circumferential bonnet channel extending into a sidewall of the bonnet section of the plunger.

22. The pneumatic tool drive system of claim 21, further comprising a resilient bonnet o-ring substantially seated within the circumferential bonnet channel of the bonnet section and at least partially extending outwardly therefrom the sidewall of the bonnet section, whereby, in use, the resilient bonnet o-ring forms a fluid-tight fit between the bonnet of the plunger and a wall of the interior cavity defined by the second end of the body and the cap.

23. The pneumatic tool drive system of claim 22, further comprising at least one pressure relief port positioned therethrough a sidewall of the cap and thereunder the bonnet of the plunger for release of fluid captured between the stem o-ring and the bonnet o-ring.

24. The pneumatic tool drive system of claim 1, further comprising a nipple disposed therein a portion of the inlet port, wherein, when the regulating assembly is mounted thereon the valve assembly, the nipple engages the valve assembly to position the valve assembly in the open position.

25. The pneumatic tool drive system of claim 1, further comprising an inlet pressure port extending therethrough the side wall of the body wherein the inlet pressure port is in fluid communication with the inlet port, and wherein the inlet pressure port further comprises an inlet pressure indicator.

26. The pneumatic tool drive system of claim 1, further comprising a working pressure port disposed therethrough the side wall of the body wherein the working pressure port is in fluid communication with the axial bore disposed therein the body, and wherein the working pressure port further comprises a working pressure indicator.

27. The pneumatic tool drive system of claim 1, wherein the pneumatic assembly is releasably connected to the outlet port of the regulating assembly, and wherein the outlet port further comprises a means for selectively positioning the outlet port in an open position in which at least a portion of the pressurized fluid is enabled to flow therethrough the outlet port and into the pneumatic assembly, or a closed position in which the pressurized fluid is prevented from flowing therethrough the outlet port and into the pneumatic assembly.

28. The pneumatic tool drive system of claim 1, wherein the bonnet has a top face and, wherein the top face of the bonnet and a portion of an interior surface of the cap define a variable cavity, whereby fluid disposed therein the variable cavity comprises a closing pressure and wherein the bias element is sized to move the plunger into the open position when the closing pressure is equal to or less than a pre-selected maximum allowable pressure, and when the closing pressure is greater than the pre-selected maximum allowable pressure, the force of the closing pressure upon the top face of the bonnet forces the plunger to move axially into the sealed position.

29. The pneumatic tool drive system of claim 28, further comprising means for changing the pre-selected maximum allowable pressure.

30. A pneumatic tool drive system, comprising:
a portable pressure source;
a valve assembly comprising a collar having an outer surface, the valve assembly in communication with the pressurized fluid source;
a regulating assembly adapted for releasable engagement with the outer surface of the collar of the valve assembly, wherein the regulating assembly comprises:
a body having a first end, a second end, and at least one sidewall;
an inlet port disposed therein the first end of the body, adapted to engage the outer surface of the collar of the valve assembly, the inlet port having a distal end;

a substantially cylindrical axial bore disposed therein the body, the bore substantially terminating at the distal end of the inlet port;

an outlet port disposed therethrough the side wall of the body wherein the outlet port is in fluid communication with the axial bore;

a cap for engaging an exterior surface of the body at the second end of the body, wherein the second end of the body and the cap define an interior cavity;

a bias element disposed therein the interior cavity, supported by the second end of the body; and a plunger having a bonnet and a stem, wherein at least a portion of the stem of the plunger is disposed therein a portion of the axial bore and the bonnet is disposed therein the interior cavity, wherein the plunger is biased against the bias element for movement between a sealed position, arresting the flow of fluid between the inlet port and the outlet port, and an open position, which allows fluid flow between the inlet port and the axial bore, wherein the bonnet has a top face, wherein the top face of the bonnet and a portion of an interior surface of the cap define a variable cavity; and a pneumatic assembly adapted for releasable engagement with an outlet port of the regulating assembly, whereby fluid disposed therein the variable cavity comprises a closing pressure, wherein the bias element is configured to move the plunger into the open position when the closing pressure is equal to or less than a pre-selected maximum allowable pressure, and, when the closing pressure is greater than the pre-selected maximum allowable pressure, the force of the closing pressure upon the top face of the bonnet forces the plunger to move axially into the sealed position.

31. The pneumatic tool drive system of claim 30, further comprising means for changing the pre-selected maximum allowable pressure.

\* \* \* \* \*